(12) United States Patent
Turk et al.

(10) Patent No.: US 8,927,898 B2
(45) Date of Patent: Jan. 6, 2015

(54) SYSTEMS AND METHOD FOR OPTIMIZATION OF LASER BEAM SPATIAL INTENSITY PROFILE

(75) Inventors: Brandon A. Turk, Escondido, CA (US); David S. Knowles, San Diego, CA (US)

(73) Assignee: TCZ, LLC, San Diego, CA (US)

( * ) Notice: Subject to any disclaimer, the term of this patent is extended or adjusted under 35 U.S.C. 154(b) by 1557 days.

(21) Appl. No.: 11/381,052

(22) Filed: May 1, 2006

(65) Prior Publication Data
US 2007/0251928 A1   Nov. 1, 2007

(51) Int. Cl.
*B23K 26/00* (2014.01)
*B23K 26/03* (2006.01)
*B23K 26/073* (2006.01)

(52) U.S. Cl.
CPC .................. *B23K 26/0738* (2013.01)
USPC .................. 219/121.65; 219/121.73

(58) Field of Classification Search
USPC ............. 219/121.65, 121.66, 121.73, 121.85
See application file for complete search history.

(56) References Cited

U.S. PATENT DOCUMENTS

| | | | | |
|---|---|---|---|---|
| 5,413,958 A | * | 5/1995 | Imahashi et al. | 438/487 |
| 5,468,987 A | * | 11/1995 | Yamazaki et al. | 257/412 |
| 5,864,430 A | * | 1/1999 | Dickey et al. | 359/559 |
| 6,341,042 B1 | * | 1/2002 | Matsunaka et al. | 359/618 |
| 6,558,991 B2 | * | 5/2003 | Yamazaki et al. | 438/151 |
| 6,596,613 B1 | * | 7/2003 | Kusumoto et al. | 438/487 |
| 6,680,460 B1 | | 1/2004 | Takaoka et al. | |
| 6,690,515 B2 | * | 2/2004 | McCulloch et al. | 359/624 |
| 6,870,126 B2 | * | 3/2005 | Jyumonji et al. | 219/121.65 |
| 6,890,839 B2 | * | 5/2005 | Kawaguchi et al. | 438/487 |
| 6,943,086 B2 | * | 9/2005 | Hongo et al. | 438/308 |
| 7,022,591 B2 | * | 4/2006 | Chang | 438/482 |

(Continued)

FOREIGN PATENT DOCUMENTS

| | | |
|---|---|---|
| CN | 1719583 A | 1/2006 |
| GB | 2177256 A | 1/1987 |
| TW | 465114 A | 8/2000 |
| WO | 2006107926 A2 | 10/2006 |

OTHER PUBLICATIONS

International Search Report for PCT/US2008/052494 mailed Jul. 8, 2008.

(Continued)

*Primary Examiner* — Sang Y Paik
(74) *Attorney, Agent, or Firm* — Procopio Cory Hargreaves & Savitch LLP; Noel C. Gillespie

(57) ABSTRACT

In a thin beam directional Crystallization System configured anneal a silicon layer on a glass substrate uses a special laser beam profile with an intensity peak at one edge. The system is configured to entirely melt a spatially controlled portion of a silicon layer causing lateral crystal growth. By advancing the substrate or laser a certain step size and subjecting the silicon layer to successive "shots" rom the laser, the entire silicon layer is crystallized. The lateral crystal growth creates a protrusion in the center of the melt area. This protrusion must be re-melted. Accordingly, the step size must be such that there is sufficient overlap between successive shots, i.e., melt zones, to ensure the protrusion is melted. This requires the step size to be less than half the beam width. A smaller step size reduces throughput and increases costs. The special laser profile used in accordance with the systems and methods described herein can increase the step size and thereby increase throughput and reduce costs.

15 Claims, 5 Drawing Sheets

(56) References Cited

U.S. PATENT DOCUMENTS

| | | |
|---|---|---|
| 7,317,179 B2 | 1/2008 | Akins et al. |
| 7,560,660 B2 * | 7/2009 | Yamazaki et al. ....... 219/121.67 |
| 7,884,303 B2 | 2/2011 | Partlo et al. |
| 8,183,498 B2 | 5/2012 | Turk et al. |
| 2003/0022471 A1 | 1/2003 | Taketomi et al. |
| 2004/0038600 A1 * | 2/2004 | Miyazawa et al. ............ 439/894 |
| 2004/0171237 A1 | 9/2004 | Tanaka et al. |
| 2005/0035103 A1 | 2/2005 | Partlo et al. |
| 2005/0259709 A1 * | 11/2005 | Das et al. ........................ 372/55 |
| 2006/0001878 A1 * | 1/2006 | Das et al. ...................... 356/400 |
| 2006/0102901 A1 * | 5/2006 | Im et al. .......................... 257/64 |
| 2007/0096008 A1 * | 5/2007 | Akins et al. ................. 250/201.1 |

OTHER PUBLICATIONS

Elve, Alexandra M., Authorized Office, ISA/US, in PCT Application No. PCT/US07/67629, in International Search Report, mailed Sep. 16, 2008, 5 pages.

Copenheaver, Blaine R., Authorized Office, ISA/US, in PCT Application No. PCT/US2008/052494, in International Search Report mailed Jul. 8, 2008, 8 pages.

* cited by examiner

SYSTEMS AND METHOD FOR OPTIMIZATION OF LASER BEAM SPATIAL INTENSITY PROFILE

BACKGROUND

1. Field of the Invention

The field of the invention relates generally to, Liquid Crystal Displays (LCDs), and more particularly to systems and methods for manufacturing LCDs.

2. Background of the Invention

There is already a well-established and growing market for active matrix LCDs, in which an active thin film transistor (TFT) is used to control each pixel in the display. For example, active matrix LCDs are the prevailing technology for computer screens. Additionally, in recent years, active matrix LCD solutions also have made dramatic inroads in market segments such as televisions, mobile phones, PDAs, video recorders, etc.

Active matrix LCDs are predicted to be the fastest growing segment of the display industry, with a projected average annual growth rate of 35 percent over the next five years. In contrast, passive LCDs and conventional cathode ray tubes (CRTs), are predicted to have flat to negative growth rates. The only other display technology predicted to have positive growth is Organic Light Emitting Diode (OLED) displays, which is just now emerging for specialized applications and is predicted to more than double each year beyond 2007.

In addition to rapid overall growth, the nature of the LCD market is changing, i.e., newer LCD applications include a more diversity and more special requirements. For example, phones represent approximately 50 percent of all LCDs but only 2 percent of total LCD area. In contrast, monitors represent approximately 27 percent of LCDs but 50 percent of the total area. With rapid growth of TV applications and large screen sizes, televisions are projected to comprise more than 30 percent of the total LCD area by 2008. These large screen applications have many special requirements compared to previous LCD applications.

To support the expected high growth rates and to successfully compete for new market opportunities, LCD manufacturers must be able to leverage emerging display fabrication techniques to improve the features and performance of the LCD offerings, while simultaneously improving their production costs and throughput.

As the LCD industry moves into the next phase of rapid growth and product diversity, some factors for success can include smaller pixel size, higher densities, which are a direct function of the size of the TFTs, and higher TFT switching speeds to support video requirements. Brighter display capabilities, improved aperture ratios for more light per pixel, and overall lower production costs are also factors for success. Lower production costs can result from both faster processing throughput and a consistently higher yield of good displays per panel. For long term success, it will be important for LCD manufacturers to invest in technology solutions that can also be cost-effectively adapted for efficient fabrication of emerging high-growth screen types such as OLED.

The two primary process methods that are currently used for creating a conductive layer on a glass substrate that will support the fabrication of TFTs for active matrix LCDs are Amorphous silicon (a-Si) and Low temperature polycrystalline silicon (poly-Si or LTPS). In the a-Si process, a gate layer is created directly on PECVD Si film. In the poly-Si or LTPS process, the PECVD Si film is crystallized prior to gate fabrication to produce higher performance TFTs. In these processes the temperature is kept low to avoid melting the glass substrate. Because the movement of electrons is inherently slower through amorphous silicon transistors, a-Si based TFTs have to be physically larger in order to provide sufficient current flow from source to drain. On the other hand, due to the significantly higher electron mobility that can be achieved with poly-silicon, LTPS based TFTs can be smaller and faster. Because poly-silicon transistors are inherently smaller, more light can pass through each pixel. This allows design flexibility to allow for improved aperture ratios, greater pixel densities, or both.

Despite the TFT size and performance advantages of LTPS, most LCD panels today are still fabricated using an amorphous-silicon process. This is due primarily to the relatively lower costs of a-Si that result from fewer process steps and the potential unknowns associated with less mature LTPS equipment. A-Si also has been a "safe" process for minimizing costs, since a single defect in a large screen LCD means scrapping the whole device; however, even though a-Si processes are fairly well established and controllable, it has now become clear that a-Si technology is approaching its limitations with regard to supporting the emerging demand for higher pixel densities, faster response, and brighter displays.

To date, LTPS has typically been targeted at fabricating smaller, higher performance displays because the smaller physical size of poly-silicon based TFTs allow for increased screen brightness, higher pixel density, and lower power consumption. Also, the inherently faster switching of LTPS transistors supports the requirements of video applications such as video recorders as well as video features in cell phones and PDAs.

Display manufacturers also need to plan ahead for the emergence of Organic Light Emitting Diode technology, which will become a significant segment of the display market with rapid growth projected to begin in 2007. Some simple OLED devices are already being deployed for specialized applications, such as small-screen, high brightness displays for automotive instruments and digital cameras. Several companies have announced their intention to produce large-screen OLED displays that, when productized, will gain significant market share for applications where display brightness and color is a key differentiating factor.

In OLED-based displays, the molecular structure actually emits light rather than acting as a light valve for a backlit light source, thus enabling much brighter screens. Because the light-emitting material in OLED is current-driven, rather than voltage-driven as in LCDs, the higher electron mobility and more stable current capacity of poly-silicon will be a key enabler for OLED implementation. The inherent higher luminescence of OLED also will allow designers to opt for smaller pixels to produce the same brightness, thereby enabling higher resolutions. Implementation of OLED displays will therefore be much more compatible with the smaller geometries achievable through poly-silicon.

Moving forward, display manufacturers need to deploy panel fabrication technologies that can provide high-throughput, high-yield capacity for poly-silicon production to meet today's diverse, rapidly growing LCD requirements while also laying the foundation for future, e.g., OLED market ramp-up. LCD or OLED fabrication methodology can focus on three areas: producing high-performance TFTs, yielding uniform material and devices across the entire panel, and optimizing production efficiency through a combination of high throughput and low operational costs.

The most widely used LTPS fabrication techniques involve a surface treatment that uses a laser to melt a silicon film, heating it to a liquid point over a very short time period, generally measured in nanoseconds, after which the Si film re-crystallizes into polycrystalline silicon. The primary challenges in LTPS technologies involve the effective control of the process to assure uniform crystallization across the entire panel while providing a high level of sustained process throughput and low operational costs.

Conventionally, one of two processes are used to melt the silicon in an LTPS process: Excimer Laser Annealing (ELA), or Sequential Lateral Solidification (SLS). Low productivity and high operational expenses of the process have hampered the wide adoption of ELA. The throughput of ELA is inherently slow, with as many as 50-100 laser pulses needed to process a single spot. Using a 300W laser, the throughput for a current generation ELA system is approximately 10 panels/hr for Gen4 LCDs and only 5-6 panels/hr for Gen5.

From a performance and yield perspective, the ELA process has other significant limitations. The ELA process is based on the principle of partial melting, in which some of the material toward the bottom remains in a solid state and acts as "seeds" that cause crystallization to occur vertically. This process is known to produce large variation in grain size and has a small process window. In addition, electron mobility is relatively low due to the small grain size, so the ELA process struggles to meet the requirements for System On Glass (SOG) or OLED.

SLS systems offer some improvement in productivity, cost, and yield. SLS is based on lateral crystal growth, where the crystallization proceeds horizontally from the edge of the molten Silicon, producing larger crystal grains with improved electron mobility. In the standard SLS technique, a mask is used to expose an area of roughly 4 mm×15 mm for each laser "shot", and the substrate is processed by stepping the small exposure area over the entire glass.

Using a 300W excimer laser, an SLS system is able to produce as many as 18 Gen4 or 10 Gen5 panels per hour. However, since the SLS mask is incrementally "stepped" to cover the panel in multiple passes, shot-to-shot variation in laser energy can lead to variability in the poly-Si throughout the panel. Stepping also can create seams due to overlap between the steps, which can be visible in display. Further, an unwanted artifact of the standard SLS technique is the large vertical protrusions that are formed during the solidification of the Silicon. The pattern of protrusions that appear after SLS annealing can make it difficult to deposit a uniform gate dielectric layer, leading to non-uniformity in the TFT performance across the panel.

To meet the needs of a rapidly changing market, displays of the future will need to be brighter with richer, more vivid colors, a faster video capability, wider viewing angles, work equally well indoors or outdoors, be more durable, and all at a lower cost.

SUMMARY

A thin beam directional crystallization system configured to anneal a silicon layer on a glass substrate uses a special short-axis laser beam profile that included an intensity peak at one edge. The system is configured to melt a portion of a silicon layer causing lateral crystal growth. By advancing the substrate, or laser, a certain per pulse step size and subjecting the silicon layer to successive "shots" from the laser, the entire silicon layer is crystallized through iterations of melting and crystal growth. The lateral crystal growth that results from each shot creates a protrusion in the center of the melt area. This protrusion must be re-melted. Accordingly, the step size must be such that there is sufficient overlap between successive shots, i.e., melt zones, to ensure the protrusion is melted. This requires the step size to be less than the distance of lateral growth from any single laser pulse. A step size equal to the lateral crystal growth length is the theoretical maximum step size. A smaller step size reduces throughput and increases costs. The special short-axis laser profile used in accordance with the systems and methods described herein can increase the step size, while still ensuring the protrusion is melted, and thereby increase throughput and reduce costs.

These and other features, aspects, and embodiments of the invention are described below in the section entitled "Detailed Description."

BRIEF DESCRIPTION OF THE FIGURES

Features, aspects, and embodiments of the inventions are described in conjunction with the attached drawings, in which.

DETAILED DESCRIPTION

Figure 1:
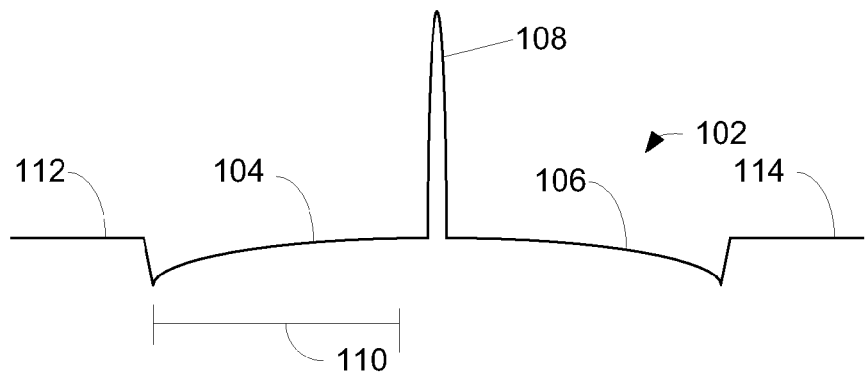
FIG. 1 is a diagram illustrating an example cross section of a film surface after a single pulse irradiation.

Thin-beam Directional Crystallization, or Thin-beam Directional 'Xtallization (TDX), fabrication methods can combine poly-silicon's inherent advantages with efficient volume-oriented production capabilities. The end result can be superior electron mobility, flat surface topology, a large process window, and greater throughput. Different types of lasers can be used in thin-beam directional crystallization, for example, in one embodiment a solid state laser can be used. In another embodiment a high power Excimer laser can be used in the TDX process. A master oscillator power amplifier (MOPA) configuration that was originally developed for semiconductor of microlithography applications can also be used. The laser can operate at 351 nanometers and provide over 900 watts of power with exceptional pulse-to-pulse stability and high reliability. Other wavelengths can also be used, for example, 308 nanometers. Generally, any wavelength that is strongly absorbed by the material to be melted, e.g., silicon, can be used. A TDX system is described in co-pending U.S. patent application Ser. No. 10/781,251 entitled "Very High Energy, High Stability Gas Discharge Laser Surface Treatment System," filed Feb. 18, 2004; U.S. patent application Ser. No. 10/884,101 entitled "Laser Thin Film Poly-Silicon Annealing Optical System," filed Jul. 1, 2004; U.S. patent application Ser. No. 10/884,547 entitled "Laser Thin Film Poly-Silicon Annealing System," filed Jul. 1, 2004; and U.S. patent application Ser. No. 11/201,877 entitled "Laser Thin Film Poly-Silicon Annealing Optical System," filed Aug. 11, 2005, which are incorporated herein by reference as if set forth in full.

The TDX optical system used in conjunction with the systems and methods described herein can convert laser light into a very long thin uniform beam and deliver it onto the silicon substrate. In addition, it can be configured to stabilize the beam's energy, density and pointing; all of which can improve the consistency of the TDX process. In one embodiment, each pulse can expose an area of approximately 5 microns wide and 720 millimeters long. The length of the beam can be matched to the substrate width so that the glass is processed in a single pass. This can help to ensure a high degree of uniformity and rapid throughput. During exposure, the panel can be scanned at a constant velocity and the laser can be triggered to fire at a pitch, or step size of, e.g., 2 microns. The pitch can be chosen so that the melt region always seeds from the high quality crystals of the previous pulse, producing long directional poly-silicon crystals. Each pulse also melts the large ridge or protrusion at the center of the previous melt region, resulting in a more planer surface.

The TDX process is based on a form of controlled super lateral growth where the melt region re-solidifies laterally from the edges and towards the center. In contrast to ELA where crystal growth proceeds vertically from within the silicon layer, lateral growth produces large directional poly-silicon grains with high electron mobility. The TDX process has a much larger process window than ELA because it relies on spatially controlled complete melting of the silicon film and avoids energy sensitive partial film melting.

The use of a System on Glass (SOG) design approach is another evolving arena that is only made possible with poly-silicon, and which will also benefit from the new TDX advances in LTPS process efficiency. The higher electron mobility and smaller size transistors that are achievable with LTPS allow the drive electronics to be fabricated directly into the thin Si coating. This provides a powerful method to reducing panel cost and also improves panel robustness by decreasing the need for tab bond connections. Poly-silicon's much higher electron mobility allows for additional integration of drive electronics such as integrating digital-to-analog converter (DAC) on the substrate and reducing the number of drivers, e.g., by using faster drivers to control more TFT switches.

The overall cost savings with SOG can be very dramatic, especially for processing large panels that consist of many small LCD screens. Using a conventional a-Si approach with separate tab bonded drive electronics for each screen; the drive chips can comprise a significant percentage of the cost per screen as well as an expensive additional assembly step. In comparison, SOG with poly-silicon allows the drive electronics to be efficiently fabricated during the backplane manufacturing process.

With this in mind, FIG. 1 is a diagram illustrating an example cross section of a film surface 102 after a single pulse irradiation in a thin-beam directional crystallization process in accordance with one embodiment of the systems and methods described herein. Film surface 102 can, for example, be amorphous silicon. The thin-beam irradiation melts a portion of surface 102 using a laser. The melted portion generally freezes or solidifies from the sides inward to the middle of the melted region, leaving two laterally solidified regions 104 and 106. This is because each un-melted edge of silicon film 102 acts as a "seed" on which the melted silicon can grow.

Protrusions 108 can exist at the last point of freezing generally at or near the center of the irradiated surface. Protrusion 108 can be caused when the two edges grow into each other. At or near the center where the two edges grow together the crystallized structures generally will not match because each edge is "seeded" from opposite sides of the melted region and these sides do not generally match each other. Where the mismatched structures meet the crystals will push into each other and push up from the surface. These protrusions 108 can be on the order of a film thickness. The film thickness is commonly about 50-100 nm, however, other film thicknesses are possible.

Protrusion 108 breaks up the uniformed crystallized structure of the surface. Further, as discussed above, the pattern of protrusions 108 that appear after annealing can also make it difficult to deposit a uniform gate dielectric layer, leading to non-uniformity in the TFT performance across the panel. In order to remove protrusion 108 it can be re-melted in the next laser shot.

For example, film surface 102 can be moved a certain step size under the laser for the next shot. The step size must be set, however, to ensure that sufficient laser energy is imported to protrusion 108 so as to ensure protrusion 108 melts. Accordingly, the need to re-melt each protrusion 108, limits the maximum step size that can be achieved. The maximum theoretical step size is equal to lateral growth distance 110, because the laser must re-melt protrusion 108. In the example of FIG. 1 the lateral growth distance is equal to about one half the width of the melt region. Therefore, the theoretical maximum step size that can be used and still ensure that protrusion 108 is melted is equal to approximately the lateral growth distance minus the width of protrusion 108.

Generally, however, the step size must be kept much less than the theoretical maximum, e.g., by several hundred nanometers where the laser pulse width is about 5 µm. This reduction reduces throughput. The actual step size will be less than the maximum theoretical step size because greater energy is required to re-melt the protrusions 108. This is because protrusion 108 is thicker than the rest of film surface 102. Additionally, protrusions 108 can scatter the laser light. So, not only will it take more energy to re-melt protrusion 108 due to its thickness, more energy will also be needed to make up for laser energy scattered by protrusion 108.

Figure 4:
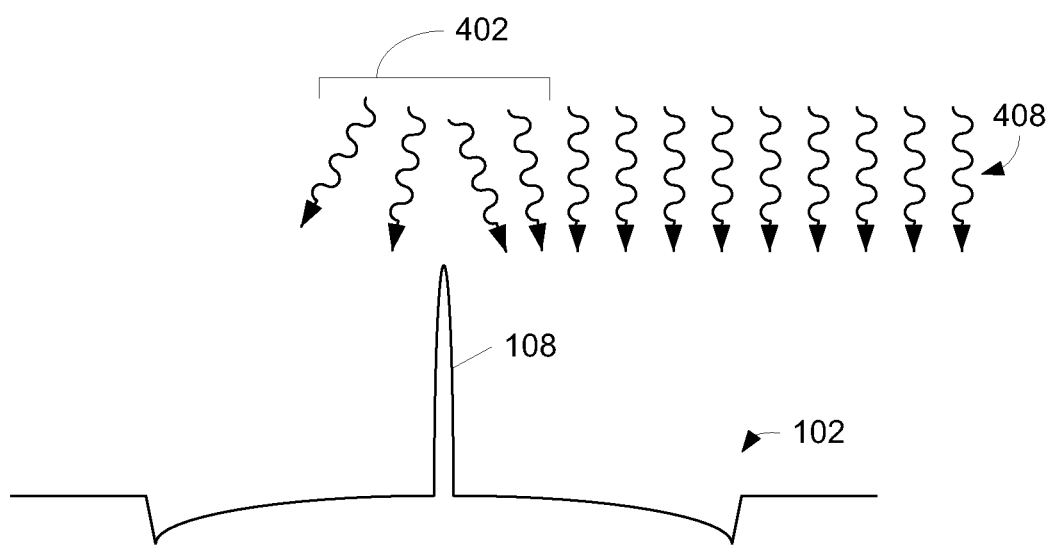
FIG. 4 is a diagram illustrating an example scattering of incident photons during the second irradiation illustrated in FIG. 3.

FIG. 4 is a diagram illustrating an example scattering of incident photons during irradiation. As incident photons 408 irradiate surface 102 some of those photons 402 are scattered by protrusion 108. Thus, more energy can be required to melt protrusion 108. As discussed above, this scattering and the extra thickness of protrusion 108 can lower the achievable step distance and increase processing time of LCDs, because more energy is required to melt protrusion 108. Accordingly, a spatial intensity, short-axis profile that directs more energy at the location of protrusion 108 can be used to maximize step size 304.

Figure 2:
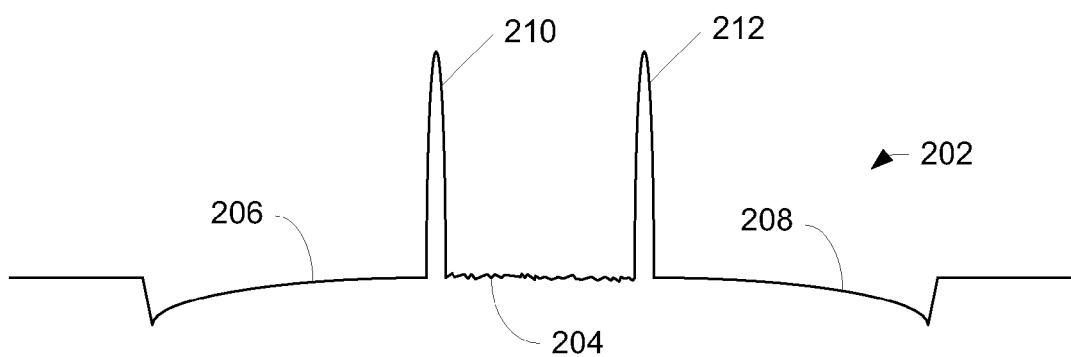
FIG. 2 is a diagram illustrating another example cross section of a film surface after a single pulse irradiation.

It should also be noted that the laser beam width must be controlled to avoid the formation of nucleated grains 204 as illustrated in FIG. 2. Nucleated grains can occur when the center cools before the sides can grow together. When the center cools before the sides can grow together, its structure will generally not match the crystalline structure of either side, since it does not "seed" off of either side. Rather if the center cools faster than the sides can grow together it will seed vertically from within. This can occur if the melted region is too wide, i.e., the laser beam width is too wide. When the melted region is too wide the sides can not grow together before the center solidifies.

If the beam is too wide, then as lateral solidified regions 206 and 208 grow to the center nucleated region 204 and two protrusions 210 and 212 can occur. Protrusions 210 and 212 can be caused when the edges grow into nucleated region 204. The crystallized structures of each lateral solidified region 206 and 208 generally will not match nucleated region 204 because each edge is "seeded" from opposite sides of the melted region. Where the mismatched structures meet the crystals will push into each other and push up from the surface. As discussed above, it is generally preferable that the crystallized structure of an LCD formed when the film surface 202 solidifies be uniformed. Protrusions 210 and 212 break up the uniformed crystallized structure of the surface. Therefore, it can be advantageous to limit the beam width such that nucleated region 204 does not occur. For example, in one embodiment, the beam width is approximately 5 μm; however, it will be understood that the beam width will depend on a particular embodiment. As long as each side can grow together before nucleation occurs, the fine-grain nucleated region 204 will not occur.

As discussed above, film surface 102 can be moved, or stepped underneath the beam to melt protrusion 108. Surface 102 can, for example be moved to the left a little less than one half the pulse width. Protrusion 108 can then be re-melted, along with a small portion of lateral solidified region 104, all of lateral solidified region 106 and a portion of un-irradiated amorphous-Si 114. As a lateral solidified region grows from the left to the right it will seed from lateral solidified region 104, continuing the crystalline structure of lateral solidified region 104 until meeting in the middle to form a new protrusion. This can be seen with respect to FIG. 3.

Figure 3:
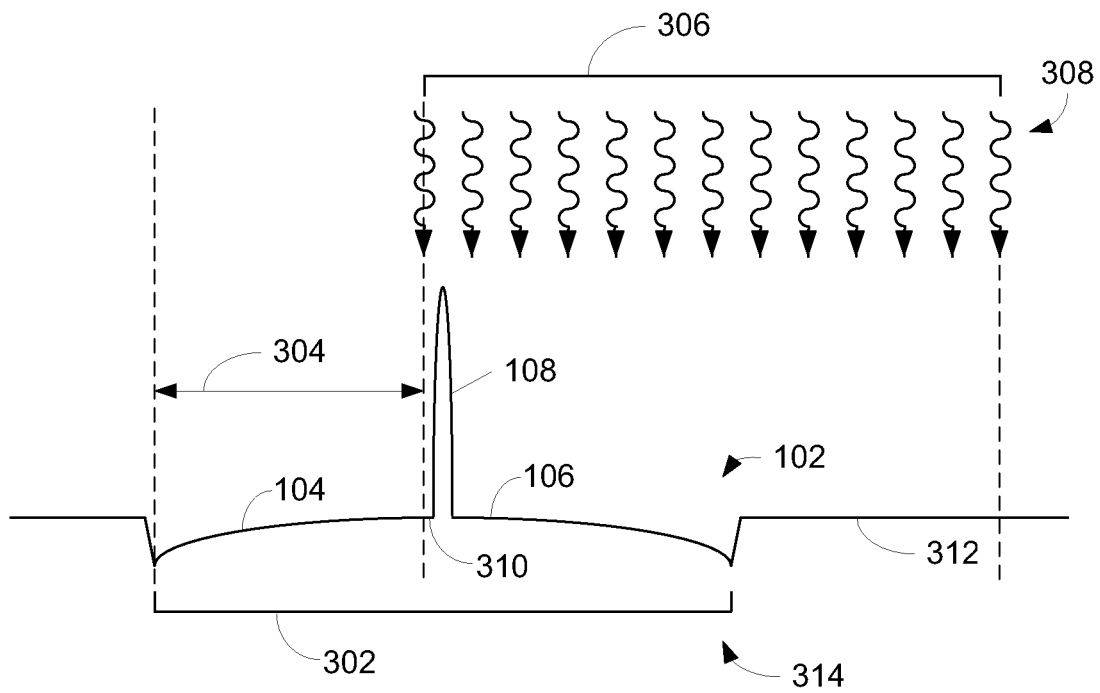
FIG. 3 is a diagram illustrating an example position of a beam during a second irradiation of the cross section of a film surface of FIG. 1.

FIG. 3 is a diagram illustrating an example position of a beam during a second irradiation of the cross section of a film surface of FIG. 1. The position of the beam during the first irradiation is shown at position 302. As discussed above, film surface 102 can be moved underneath the beam to melt the next section of surface 102. Surface 102 can, for example, be moved to the left a step distance 304 which can be a little less than one half the pulse width. The beam will then be positioned at 306 during the second shot, which will irradiate surface 102 with incident photons 308. Photons 308 can re-melt protrusion 108 along with a small portion 310 of lateral solidified region 104, all of lateral solidified region 106 and a portion 312 of un-irradiated amorphous-Si 114. As a new lateral solidified region grows from the left to the right it will seed from lateral solidified region 104, continuing the crystalline structure of lateral solidified region 104 until meeting in the middle of the new melt region to form a new protrusion. The new protrusion will form at approximately position 314.

Figure 6:
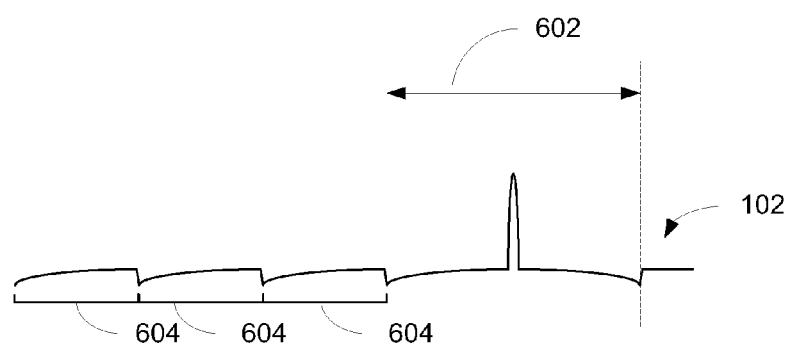
FIG. 6 is a diagram illustrating an example position of a beam after "n" pulses.

FIG. 6 is a diagram illustrating an example position 602 of a beam after "n" pulses. Film surface 102 can be moved at a constant rate. Each pulse can be timed to occur as film surface 102 moves one nominal step size 604. As can be seen, successive lateral solidification regions 604, each approximately half the length of beam width 602, are produced as the laser moves along the surface 102. As was discussed above, the nominal step size 604 is generally less than the theoretical maximum step size, and the actual step size can be maximized by having an intensity peak near protrusion 108.

Referring to FIG. 3, step distance 304 can be less than the theoretical maximum because it takes extra energy to re-melt protrusion 108 and light can be scattered by protrusion 108. Processing can only proceed as each section cools. Smaller steps can increase process time and waste time re-melting area that was melted before. Small portion 310 of lateral solidified region 104 is re-melted by photons 308 from the beam. As will be understood, the larger the small portion 310, the longer it will generally take to process film surface 102. Therefore, if small portion 310 can be minimized, i.e., a larger step size can be achieved, then this can generally speed up the manufacture process leading to faster processing time and larger production volumes.

Figure 5A:
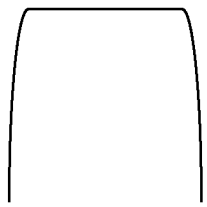
FIGS. 5A-5C are diagrams illustrating example short-axis spatial intensity profiles.
Figure 5B:
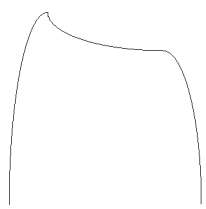
Figure 5C:
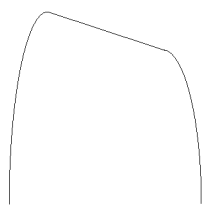

FIGS. 5A-5C are diagrams illustrating example short-axis spatial intensity profiles that can be used to direct more energy at the location of protrusion 108. FIG. 5A shows a top-hat profile. Generally, a top hat profile with steep sides, such as that illustrated in FIG. 5A, is preferable because it results in a more uniform application of energy to the surface 102; however as noted, it can be preferable to direct more energy at protrusion 108 in order to increase the step size. More energy can be directed at protrusion 108 by raising the energy density of a beam with a top hat profile such as that illustrated in FIG. 5A. But generally it is not sufficient to simply raise the energy density of the beam with a top-hat spatial profile, as this could ultimately lead to film damage or agglomeration at the side of the beam which is incident upon the amorphous-Si film.

Figure 8:
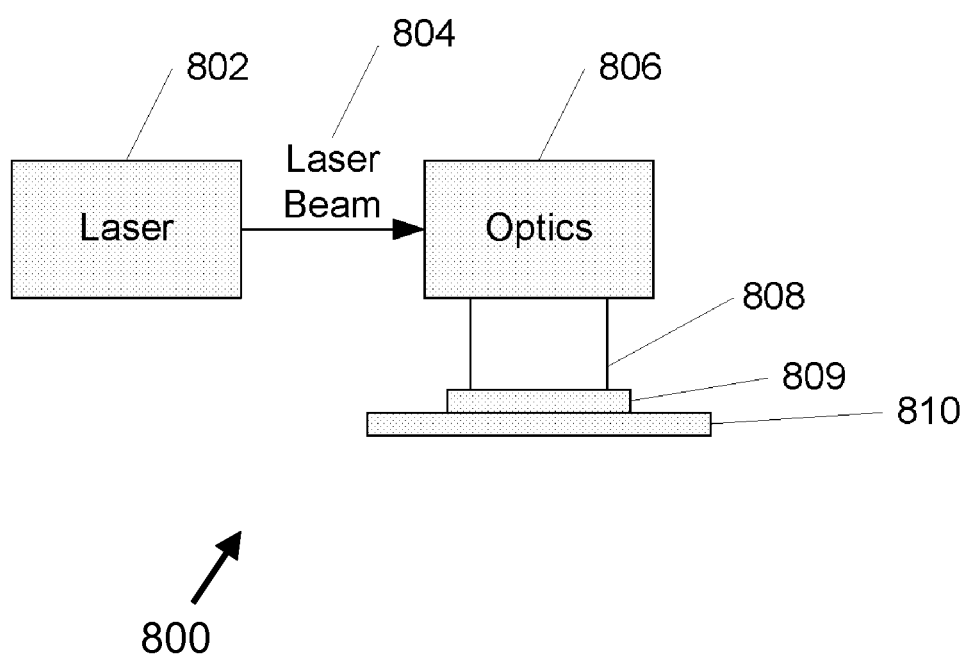
FIG. 8 is an example device for manufacturing a liquid crystal display.

A laser beam short-axis profile that roughly correlates the intensity profile of the beam to the required melting temperature of the film is generally preferred. The profile can be tailored to enable the maximum per-pulse step distance without exceeding the damage threshold. FIGS. 5B and 5C illustrate two short-axis profiles with intensity peaks occurring on the edge of the beam that correlates with the location of protrusion 108. For example, proper control of the beam delivery and beam treatment systems as illustrated in FIGS. 8 and 9 of Co-pending U.S. patent application Ser. No. 10/884,547 entitled "Laser Thin Film Poly-Silicon Annealing System," filed Jul. 1, 2004, which is incorporated herein by reference as if set forth in full, can be used to manipulate the short-axis spatial intensity profile.

Figure 7:
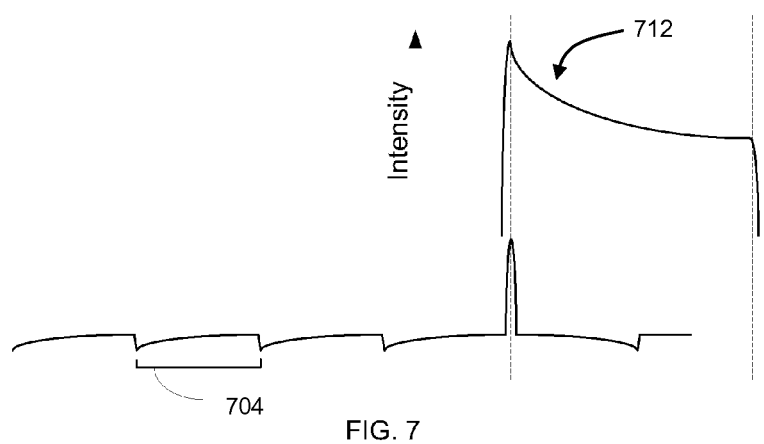
FIG. 7 is a diagram illustrating a beam spatial intensity and an example position of a beam after "n+1" pulses.

FIG. 7 is a diagram illustrating the use of a beam 712 with a short-axis, spatial intensity profile similar to that illustrated in FIG. 5b. As was discussed above, a short-axis laser beam profile that roughly correlates the intensity profile of the beam to the required melting temperature of the film is generally preferred. As can be seen in FIG. 7 the intensity is highest near protrusion 108. In this way more energy can be supplied to provide the additional energy that can be required to melt protrusion 108 due to increased thickness and scattering, as discussed above. Because more energy is contained in the left hand side of the short-axis profile, the step size 704 can be increased, such that it more closely approaches the theoretical maximum, but still ensures adequate melting of protrusion 108.

In other words, by using a short axis, spatial intensity profile, such as illustrated in FIGS. 5B and 5C, portion 310 can be reduced and the step size can be increased. It will be understood that the increase in size will depend on the implementation, but that the step size can be nearer to the theoretical maximum due to the increased intensity of the beam at the location of protrusion 108. The step size can, for example, be increased up to several hundred nanometers for a sum beam width.

FIG. 8 is an example surface treatment system 800 for manufacturing a liquid crystal display in accordance with one embodiment of the systems and methods described herein. Thin-beam Directional Crystallization as described above, combines the benefits of lateral crystal growth with higher throughput, improved poly-Silicon uniformity and tailoring the short-axis spatial intensity profile to the energy required to the melt silicon film. In contrast to the standard ELA process, the Thin-beam Directional Crystallization process increases throughput while producing more uniform material.

Using a specially designed laser 802 and custom beam forming optics 804, substrate 809 can be exposed with a long thin beam 808. A beam forming optical system 804 can produce a short-axis spatial laser beam profile, e.g., as discussed above with respect to FIGS. 5A and 5B. In one embodiment long thin beam 808 can measure 5 microns wide by up to 730 mm long. This beam configuration can allow for complete coverage across the width of a glass substrate 809 during a single laser pulse. Because a 5 microns wide region is rendered completely molten, the Silicon solidifies by lateral growth crystallization, resulting in high mobility poly-Si. To process the entire substrate 809, the glass can be scanned beneath the beam 808 so that the crystallization occurs in a single pass. The glass can move at a constant velocity, and the laser can be triggered to fire after a translation of approximately 2 µm. By overlapping each new "stripe" over the previous one, a new stripe can be "seeded" from good poly-Si of the previous stripe, and the system can achieve continuous growth of a long, uniform crystal grains across the entire substrate 809.

Thin-beam Directional Crystallization with a short-axis spatial intensity profile as described above can be much more efficient than ELA, with much fewer pulses used to expose each area, as compared to 20-40 pulses used in ELA. This can provide much higher panel throughput. In addition, the process window can be much larger than ELA because it does not rely on partial melting, which can help to improve yield. Since the entire panel can be exposed in a single pass, the Thin-beam Directional Crystallization with a short-axis spatial intensity profile process as described above can also avoid the non-uniformity caused by the overlapping regions that are seen in multi-pass exposure techniques such as SLS and ELA.

The practical realization of the Thin-beam Directional Crystallization can include, for example, three major components in the system: the laser 802, the beam forming optics 804 and the stage 810. In one embodiment a specially designed high power laser 802 with a carefully chosen combination of power, pulse frequency and pulse energy to support the long beam and high scan rates can be used. This laser 802 can, for example, provide 900 W of power, which is almost three times the current ELA laser power, to ensure the highest throughput. In one embodiment a laser 802 originally designed for the demanding semiconductor lithography application can be used to ensure good uniformity of the poly-Si and the TFT performance throughout the substrate.

In one embodiment stage 810 can be moved under long thin beam 808 using a stepper or translator. In this way the portion of panel 809 that is under beam 808 can be controlled so that various parts of panel 809 can be processed. In one embodiment, panel 809 can be an amorphous silicon coated glass panel. Thus, beam 808 can be used to melt a silicon film surface on panel 809.

An optical system was developed to create the optimal beam shape. In one embodiment the optimal beam shape can be long enough to cover the entire width of a substrate and narrow enough to optimize the crystallization process. Particular care can be taken with the design of the projection optics contained in the optical system to ensure thermal stability and controlled Depth of Focus (DOF) under high power loads, and to maximize the optics lifetime.

In one embodiment, to ensure rapid motion in the scan direction, the laser must operate at a high repetition rate, for example, at 6 kHz, and the stage speed can, e.g., be 12 mm/sec for an approximately 2 micron pitch. The substrate can be exposed in a single pass, which requires approximately a 150 mJ/pulse to expose a Gen4 substrate. In one embodiment a thin beam crystallization system with a 6 kHz, 900W laser can process an entire Gen4 panel in as little as 75 seconds.

A more detailed explanation of example embodiments of a surface treatment system 800 that can be used in accordance with the systems and methods described herein are described in U.S. application Ser. Nos. 10/781,251; 10/884,101; 10/884,547; and 11/201,877.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A method of processing a liquid crystal display, comprising:
   shaping a laser beam profile in a short axis so as to have steep sides at both edges, an increasing linear gradient between both edges, and an intensity peak near one edge of the profile that corresponds to a protrusion in a silicon film to which the beam is applied; and
   scanning a laser beam that includes the laser beam profile over the silicon film using a step size near a maximum step size,
   wherein the shaping the laser beam short axis profile further comprises correlating the intensity profile of the laser beam to a melting temperature of the silicon film,
   wherein the width of the laser beam in the short axis is dimensioned to produce, responsive to the laser beam firing, a single protrusion in the silicon film, and
   wherein the edge of the profile having the intensity peak is a trailing edge of the laser beam with respect to relative movement between the silicon film and the laser beam.

2. The method of claim 1, further comprising shaping the long axis profile of the laser beam to produce a long, thin beam.

3. The method of claim 2, wherein the laser beam profile is approximately 5 microns wide in the short axis.

4. The method of claim 3, wherein the beam profile is 730 mm long.

5. The method of claim 3, wherein the beam profile is approximately as wide as a glass substrate.

6. The method of claim 3, wherein a glass substrate moves at a constant velocity under the beam profile.

7. The method of claim 6, wherein the beam profile is triggered to fire after a translation of 0.5 to 4 microns.

8. The method of claim 5, wherein the beam profile is triggered to fire after a translation of approximately 2.5 microns.

9. The method of claim 1, wherein the beam has a wave length of 351 nm.

10. The method of claim 1, wherein the beam has a wave length of 308 nm.

11. The method of claim 1, wherein the protrusion extends above the surface of the silicon film by an order of a thickness of the silicon film.

12. The method of claim 1, wherein the short axis of the beam profile has a first edge having a minimum beam intensity and a second edge having the peak beam intensity, and the gradient in intensity maintains a constant slope between the first edge and second edge.

13. The method of claim 1, wherein the short axis of the beam profile has a first edge having a minimum intensity and a second edge having the peak intensity of the profile, and the gradient in intensity maintains an increasing slope between the first edge and the second edge.

14. The method of claim 1, wherein maximum step size is equal to one-half the width of the melt region generated by the beam application.

15. The method of claim 1, wherein maximum step size is equal to the lateral growth distance of the silicon film between beam applications minus the width of the protrusion.

* * * * *